(12) United States Patent
Li et al.

(10) Patent No.: US 11,874,869 B2
(45) Date of Patent: Jan. 16, 2024

(54) MEDIA RETRIEVAL METHOD AND APPARATUS

(71) Applicant: BEIJING BYTEDANCE NETWORK TECHNOLOGY CO., LTD., Beijing (CN)

(72) Inventors: Gen Li, Beijing (CN); Yi He, Beijing (CN); Lei Li, Beijing (CN); Yitan Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/962,416

(22) PCT Filed: Dec. 29, 2018

(86) PCT No.: PCT/CN2018/125495
§ 371 (c)(1),
(2) Date: Jul. 15, 2020

(87) PCT Pub. No.: WO2019/184519
PCT Pub. Date: Oct. 3, 2019

(65) Prior Publication Data
US 2021/0073262 A1 Mar. 11, 2021

(30) Foreign Application Priority Data
Mar. 29, 2018 (CN) .......................... 201810272795.X

(51) Int. Cl.
*G06F 16/41* (2019.01)
*G06F 16/438* (2019.01)
(Continued)

(52) U.S. Cl.
CPC ............ *G06F 16/41* (2019.01); *G06F 16/438* (2019.01); *G06F 18/2113* (2023.01); *G06F 18/22* (2023.01)

(58) Field of Classification Search
CPC ............................... G06F 16/438; G06F 16/41
(Continued)

(56) References Cited

U.S. PATENT DOCUMENTS 7,996,395 B2   8/2011   Li et al.
2007/0162497 A1   7/2007   Pauws
(Continued)

FOREIGN PATENT DOCUMENTS

CN   103440313 A   12/2013
CN   104778276 A   7/2015
(Continued)

OTHER PUBLICATIONS

Sivic et al.; "Video Google: A Text Retrieval Approach to Object Matching in Videos"; 9$^{th}$ Proceedings Int'l Conf. on Computer Vision; 2003; 8 pages.
(Continued)

*Primary Examiner* — Kimberly L Wilson
(74) *Attorney, Agent, or Firm* — BakerHostetler

(57) ABSTRACT

The present disclosure relates to a media retrieval method and apparatus, wherein the method comprising: acquiring a media feature of a query media as a first media feature which contains a plurality of first media feature units; performing, according to each individual of the first media feature unit, a first ranking on a plurality of existing media, and taking, according to a result of the first ranking, first k existing media as a first candidate media set, where k is a positive integer; and performing, according to the plurality of the first media feature units arranged in sequence, a second ranking on the first candidate media set, and taking, according to a
(Continued)

result of the second ranking, first n first candidate media as a retrieval result, where n is a positive integer.

20 Claims, 9 Drawing Sheets

(51) Int. Cl.
 *G06F 18/22* (2023.01)
 *G06F 18/2113* (2023.01)
(58) Field of Classification Search
 USPC .......................................................... 707/748
 See application file for complete search history.

(56) References Cited

U.S. PATENT DOCUMENTS

| | | | |
|---|---|---|---|
| 2009/0112830 A1 | 4/2009 | Denoue et al. | |
| 2014/0244631 A1* | 8/2014 | Arthur | G06F 40/30 |
| | | | 707/723 |
| 2014/0324836 A1* | 10/2014 | Chittar | G06V 10/242 |
| | | | 707/722 |
| 2014/0373047 A1* | 12/2014 | Steck | H04N 21/251 |
| | | | 725/34 |
| 2015/0186624 A1* | 7/2015 | Lee | G06F 21/105 |
| | | | 726/26 |
| 2016/0140231 A1 | 5/2016 | Agarwal | |
| 2019/0138263 A1* | 5/2019 | Kong | G06F 3/165 |

FOREIGN PATENT DOCUMENTS

| | | |
|---|---|---|
| CN | 106649440 A | 5/2017 |
| CN | 107402965 A | 11/2017 |
| CN | 107577773 A | 1/2018 |
| JP | H10-240765 A | 9/1998 |
| JP | 2001-134584 A | 5/2001 |
| JP | 2007-519092 A | 7/2007 |
| JP | 2011-128903 A | 6/2011 |

OTHER PUBLICATIONS

Guanqun Studio; "Internet old bugs talk about the classics"; China Machine Press; Aug. 2000; p. 167 (contains English Translation).

\* cited by examiner

MEDIA RETRIEVAL METHOD AND APPARATUS

CROSS-REFERENCE TO RELATED APPLICATION

The disclosure is the national phase application of International Patent Application No. PCT/CN2018/125495, titled "MEDIA RETRIEVAL METHOD AND APPARATUS", filed on Dec. 29, 2018, which claims priority to Chinese Patent Application No. 201810272795.X filed on Mar. 29, 2018, the entire contents of both of which are incorporated herein by reference.

TECHNICAL FIELD

The present disclosure relates to the technical field of media processing, in particular to a media retrieval method and apparatus.

BACKGROUND ART

Video features, audio features and other media features (or called media fingerprints) as well as feature-based media retrieval are widely used in today's "multimedia information society". The media retrieval is firstly applied to identifying songs where the corresponding songs are identified by inputting a piece of audio and extracting and retrieving the fingerprint features of the audio. In addition, the media retrieval can also be applied to content monitoring, such as media deduplication, voice advertisement monitoring based on retrieval, media copyright and the like.

The existing media retrieval methods have the problems of poor accuracy and low speed so as to generate huge consumption for operation resources and storage resources.

SUMMARY

The purpose of the present disclosure is to provide a new media retrieval method and device.

The purpose of the present disclosure is to be realized by adopting the following technical scheme. The media retrieval method according to the disclosure includes the following steps: acquiring a media feature of a query media as a first media feature which contains a plurality of first media feature units; performing, according to each individual of the first media feature unit, a first ranking on a plurality of existing media, and taking, according to the result of the first ranking, first k existing media as a first candidate media set, where k is a positive integer; and performing, according to the plurality of the first media feature units arranged in sequence, a second ranking on the first candidate media set, and taking, according to the result of the second ranking, first n first candidate media as a retrieval result, where n is a positive integer.

The purpose of the present disclosure can be further realized by adopting the following technical measures.

The preceding media retrieval method further comprises: acquiring the media feature of the existing media as a second media feature in advance which contains a plurality of second media feature units; and indexing the second media feature to obtain a feature index of the existing media in advance.

The preceding media retrieval method, wherein the step of performing, according to each individual of the first media feature unit, a first ranking on a plurality of existing media comprises: performing, according to each individual of the first media feature unit, the term frequency-inverse document frequency (TF-IDF) ranking on a plurality of existing media.

The preceding media retrieval method, wherein the step of performing, according to each individual of the first media feature unit, the term frequency-inverse document frequency (TF-IDF) ranking on a plurality of existing media comprises: matching the feature index of the existing media with the first media feature unit to perform the TF-IDF ranking on the existing media.

The preceding media retrieval method, wherein the step of obtaining a feature index of the existing media in advance comprises: acquiring a forward index and/or an inverted index of the existing media in advance.

The preceding media retrieval method, wherein the step of matching the feature index of the existing media with the first media feature unit comprises: making an exact match for the feature index of the existing media and the first media feature unit.

The preceding media retrieval method, wherein the step of performing, according to the plurality of the first media feature units arranged in sequence, a second ranking on the first candidate media set comprises: obtaining a similarity matrix of the media in the first candidate media set according to the feature index of the existing media and the first media feature, and rank the media in the first candidate media set on the basis of the straight line in the similarity matrix.

The preceding media retrieval method, wherein, the step of acquiring a media feature of a query media as a first media feature comprises: acquiring multiple types of the first media feature of the query media; the step of acquiring the media feature of the existing media as a second media feature in advance comprises: acquiring multiple types of the second media feature of the existing media; and the step of obtaining a similarity matrix of the media in the first candidate media set according to the feature index of the existing media and the first media feature comprises: determining the similarity matrix according to the multiple types of the second media features and the multiple types of the first media features.

The preceding media retrieval method, wherein, each type of the first media feature includes a plurality of the first media feature units, and each type of the second media feature includes a plurality of the second media feature units; the step of determining the similarity matrix according to the multiple types of the second media features and the multiple types of the first media features comprises: and determining the unit similarity of the same type of the second media feature unit and the first media feature unit respectively so as to obtain multiple types of the unit similarities; determine the average or minimum value of the multiple type of the unit similarities and determine the similarity matrix according to the average or minimum value of the multiple types of the unit similarities.

The preceding media retrieval method, further comprising: slicing the query media and the existing media according to a preset time span to obtain a plurality of segments of the sub query media segments and segments of the sub existing media, and extracting the media features of the plurality of segments of the sub query media and segments of the sub existing media respectively to obtain a plurality of the first sub media features and the second sub media features of the same length.

The preceding media retrieval method, further comprising: slicing, before the first ranking is performed, the obtained first media feature of the query media and the second media feature of the existing media according to a preset length to obtain a plurality of the first sub media features and the second sub media features of the same length.

The preceding media retrieval method, wherein, the plurality of the first media feature units are arranged in a temporal order in the first media feature, and the plurality of the second media feature units are arranged in a temporal order in the second media feature.

The preceding media retrieval method, further comprising: determine the duplicate segment of the query media and the media in the retrieval result according to the straight line in the similarity matrix.

The purpose of the present disclosure is to be realized by further adopting the following technical scheme. The media retrieval apparatus according to the disclosure comprises: a media feature acquisition module configured to acquire a media feature of a media as a first media feature which contains a plurality of first media feature units; a first ranking module configured to perform, according to each individual of the first media feature unit, a first ranking on a plurality of existing media, and to take, according to the result of the first ranking, first k existing media as a first candidate media set, where k is a positive integer; and a second ranking module configured to perform, according to the plurality of the first media feature units arranged in sequence, a second ranking on the first candidate media set, and to take, according to the result of the second ranking, first n first candidate media as a retrieval result, where n is a positive integer.

The purpose of the present disclosure is to be realized by further adopting the following technical scheme.

The preceding media retrieval apparatus, further comprises modules for performing the steps of any one of the preceding method.

The purpose of the present disclosure is to be realized by further adopting the following technical scheme. A hardware device for media retrieval according to the present disclosure comprises: a memory, configured to store non-transitory computer-readable instructions; and a processor, configured to perform the media retrieval method according to any of claims 1 to 13 when the computer-readable instructions are executed by the processor.

The purpose of the present disclosure is to be realized by further adopting the following technical scheme. A computer-readable storage medium according to the present disclosure stores non-transitory computer-readable instructions to perform the media retrieval method according to any of the preceding method when the non-transitory computer-readable instructions are executed by a computing device.

The purpose of the present disclosure is to be realized by further adopting the following technical scheme. A terminal device according to the present disclosure comprises the media retrieval apparatus according to any of the preceding apparatus The above description is only an overview of the technical scheme of the present disclosure. In order to have a better understanding of the technical scheme of the present disclosure and implement it in accordance with the contents of the description, and to make the above and other purposes, features and advantages of the present disclosure more obvious and understandable, the followings are preferred embodiments, and are described in detail with the accompanying drawings.

DETAILED DESCRIPTION OF THE DISCLOSURE

In order to further elaborate the technical means and efficiency adopted by the present disclosure to achieve the intended invention goal, the following is a detailed description of specific embodiments, structure, features and effect of the media retrieval method and apparatus according to the present disclosure in combination with the attached drawings and preferred embodiments.

Figure 1:
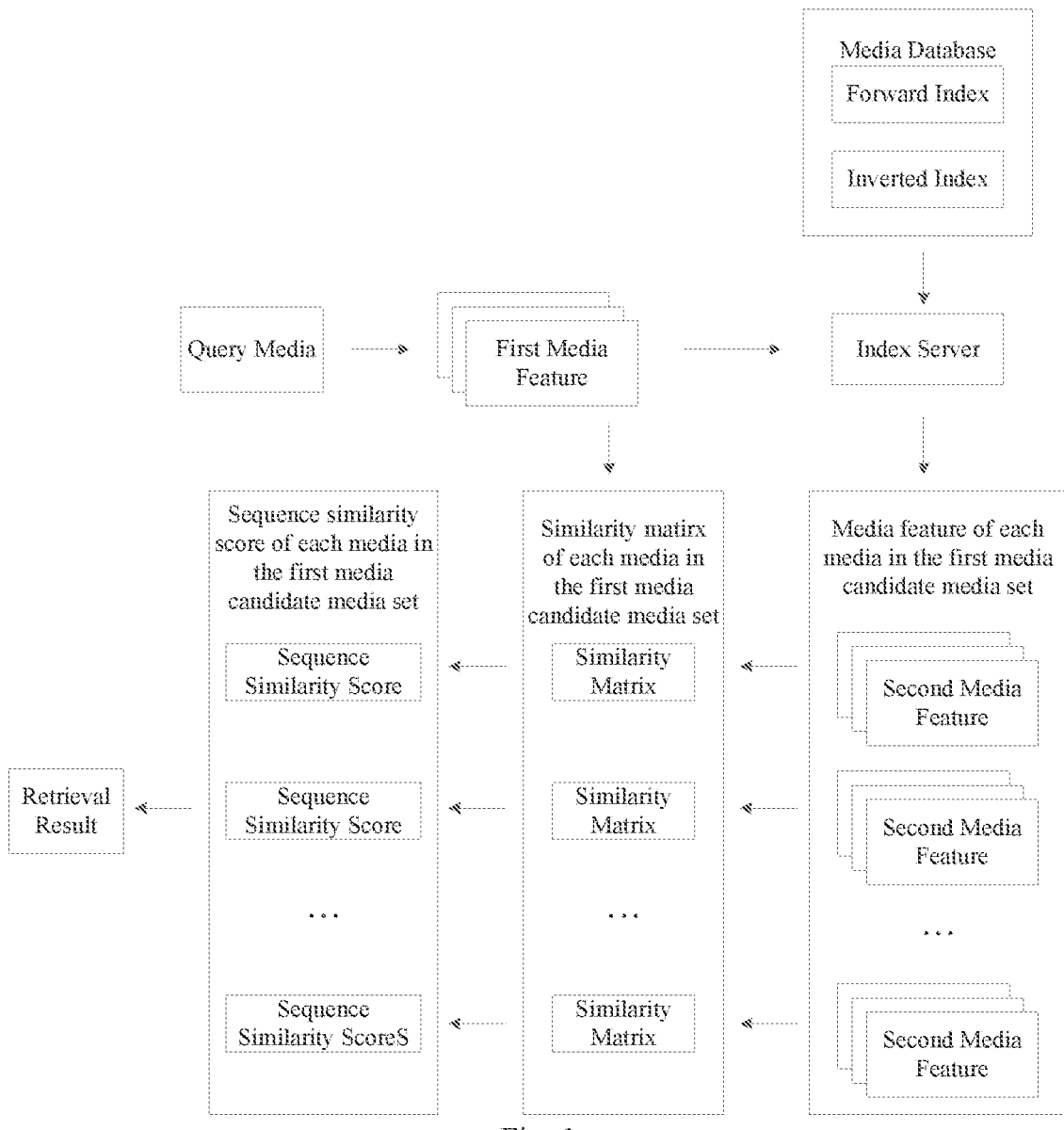
FIG. 1 is a flow block diagram of a media retrieval method provided by one embodiment of the present disclosure.
Figure 2:
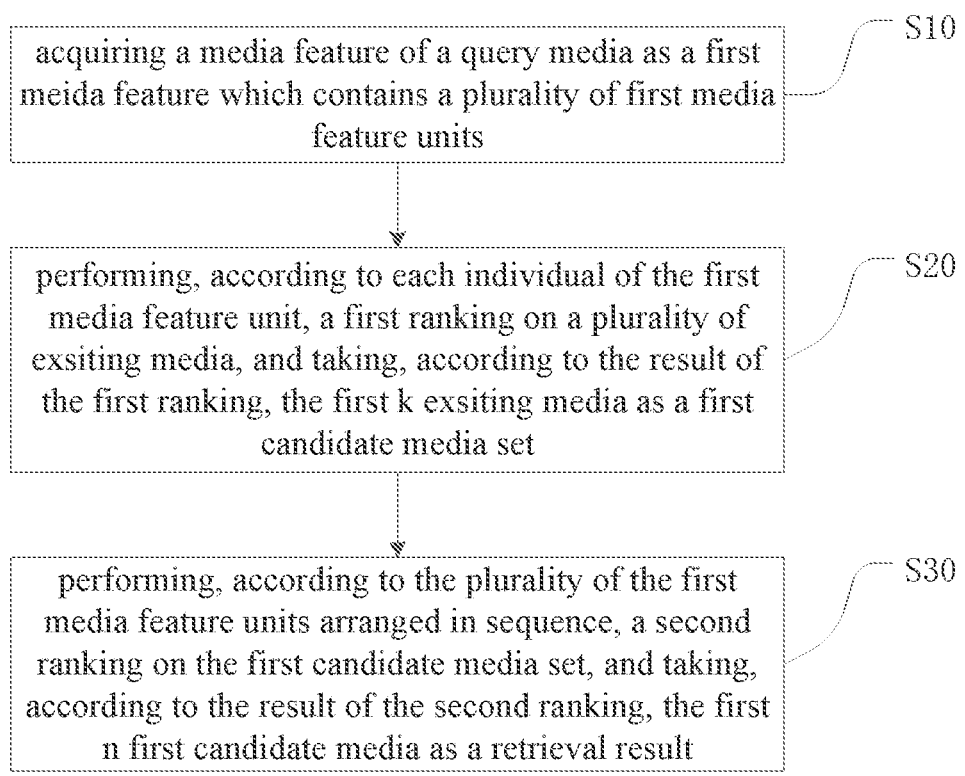
FIG. 2 is a flow diagram of a media retrieval method provided by one embodiment of the present disclosure.

FIG. 1 is a schematic flow diagram of a media retrieval method according to an embodiment of the present disclosure, and FIG. 2 is a schematic flow diagram of a media retrieval method according to an embodiment of the present disclosure. Referring to FIGS. 1 and 2, the media retrieval method according to an embodiment of the present disclosure mainly comprises the following steps.

At step S10, a media feature of a media to be retrieved (Query Media) is acquired.

Specifically, the media feature acquired is a feature sequence containing one or more media feature units arranged in order in the media feature. In order to facilitate narration and understanding, the media feature of the query media may be referred to as the first media feature, and the media feature unit contained in the first media feature may be referred to as the first media feature unit. Thereafter, the process proceeds to step S20.

It should be noted that the media referred to in each embodiment of the present disclosure may be various types of media such as audio, video, multiple consecutive photos, and the like. The media feature herein may be audio features, video features or media feature units, etc., and in fact the retrieval of video objects may be performed by acquiring audio features of the video in accordance with the methods of the present disclosure.

At step 20, a first ranking is performed on a plurality of existing media according to the first media feature, and first k existing media are taken as a first candidate media set according to the result of the first ranking, where k is a positive integer, and the specific value of k is configurable. Specifically, the first ranking is a ranking based on the matching of each individual first media feature unit to an existing media. Further, the first ranking may be a term frequency-inverse document frequency ranking (TF-IDF Ranking) performed on the existing media according to each first media feature unit. Thereafter, the process proceeds step S30.

At step S30, a second ranking is performed on the first candidate media set according to the first media feature, and first n first candidate media in the first candidate media set are extracted as a retrieval result according to the result of the second ranking, where n is a positive integer and the specific value of n is configurable. Specifically, the second ranking is a ranking of the media in the first candidate media set based on a plurality of the first media feature units arranged in sequence. For example, the plurality of the first media feature units arranged in sequence include a continuous part of the first media feature and the whole of the first media feature, and/or the plurality of the first media feature units arranged in sequence include a plurality of first media feature units with serial numbers of the same interval in the first media feature unit, such as a plurality of first media feature units with serial numbers of 1, 3, 5, 7 and etc.

The media retrieval method proposed in the disclosure can greatly improve the accuracy and efficiency of media retrieval by performing the first ranking and the second ranking to obtain the retrieval results.

The above steps are stated and explained in detail below.

1. With Respect to Step S10

It should be noted that the method for extracting media features and the type of media features are not limited. In an exemplary embodiment of the present disclosure, the binary media feature of the query media may be extracted, or the media feature (not limited to a specific type) obtained in advance may be binarized to obtain a binary media feature. Each of the media feature unit of the binary media feature is a bit string composed of 0/1, so that the binary media is characterized by a sequence of bit strings arranged in sequence. In another exemplary embodiment, the floating-point number media feature, of which each the media feature unit is a floating-point number, of the Query Media may be extracted, so that the floating-point number media feature is a sequence of multiple floating-point numbers arranged in sequence.

In some embodiments, the "arranged in sequence" herein refers to a plurality of media feature units arranged in chronological order in the media feature. For example, in the process of extracting media features in advance, frames of a media object are extracted at first, and then one media feature unit is generated according to each frame, so that each media feature unit corresponds to each frame of the media object, and then each of the media feature unit is arranged in a chronological order of the respective frames in the media object to obtain media features. Therefore, the aforementioned media feature unit may also be referred to as a frame feature.

2. With Respect to Step S20

The aforementioned existing media may be a media in a media database. A plurality of media features of the existing media are stored in the media database, and the same type of media features as the first media features obtained by using the same extraction method as the first media feature are included in the stored media features of the existing media.

In some embodiments of the present disclosure, the media retrieval method of the present disclosure further includes: acquiring media features of a plurality of existing media in advance, wherein, for expression and understanding, the media features of the existing media may be referred to as second media features and the media feature units contained in the second media features may be referred to as the second media feature unit; indexing the second media feature to obtain a feature index of the existing media in advance; and matching the feature index with the first media feature unit to perform the TF-IDF ranking on the plurality of existing media.

Specifically, the aforementioned acquiring the feature index of the existing media in advance further includes: acquiring a forward index and an inverted index of the media feature of the existing media in advance, so as to compare and retrieve the media features. The forward index and the inverted index may be pre-stored in a media database. the forward index is used to record the media features of each existing media, that is, to record the specific media feature unit contained in each existing media and the order of these media feature units; the inverted index is used to record which media features of existing media the media feature units appear in. Specifically, the forward and inverted index may be stored in the form of a key-value pair: in the forward index, a number (alternatively, referred to as a media ID) of a media is represented by a key, and a value corresponding to the key records which media feature units are contained in the media and the order of the media feature unit, and the key and value in the forward index may be referred to as a forward key and a forward value respectively; in the inverted index, a media feature unit is represented by a key, and a value corresponding to the key records the media ID of the media containing the media feature unit, and the key and the value in the inverted index may be referred to as an inverted key and an inverted value respectively.

The TF-IDF ranking is a technology for ranking information by weighting the term frequency and the inverse document frequency of the information to judge the importance of the information. The term frequency refers to the frequency of a word (or a message) appearing in an article (or a file), and the higher term frequency indicates that the word is more important to the article; the document frequency refers to how many articles a word appears in within an article library, and the inverse document frequency is the reciprocal of the document frequency (in practical calculation, the reverse document frequency can also be logarithmed, or the inverse document frequency is defined to be the logarithm of the reciprocal of the document frequency), and the higher the reverse document frequency, the better the discrimination of the word. Therefore, the TF-IDF ranking is ranked according to the product of the term frequency and the inverse document frequency. In fact, the media feature of a media can be treated as an article and each media feature unit as a word so that existing media can be ranked in use of the TF-IDF approach.

In addition, if the first ranking is performed on all existing media in the media database, the efficiency of the first ranking may be affected, so that the existing media in the media database may be made an exact match for before the second ranking. The exact match is used for selecting the existing media with the number of the included first media feature units being no less than the preset number or the preset proportion as a second candidate media set. Then, a first ranking is performed on the second candidate media set to select the first candidate media set.

Figure 3:
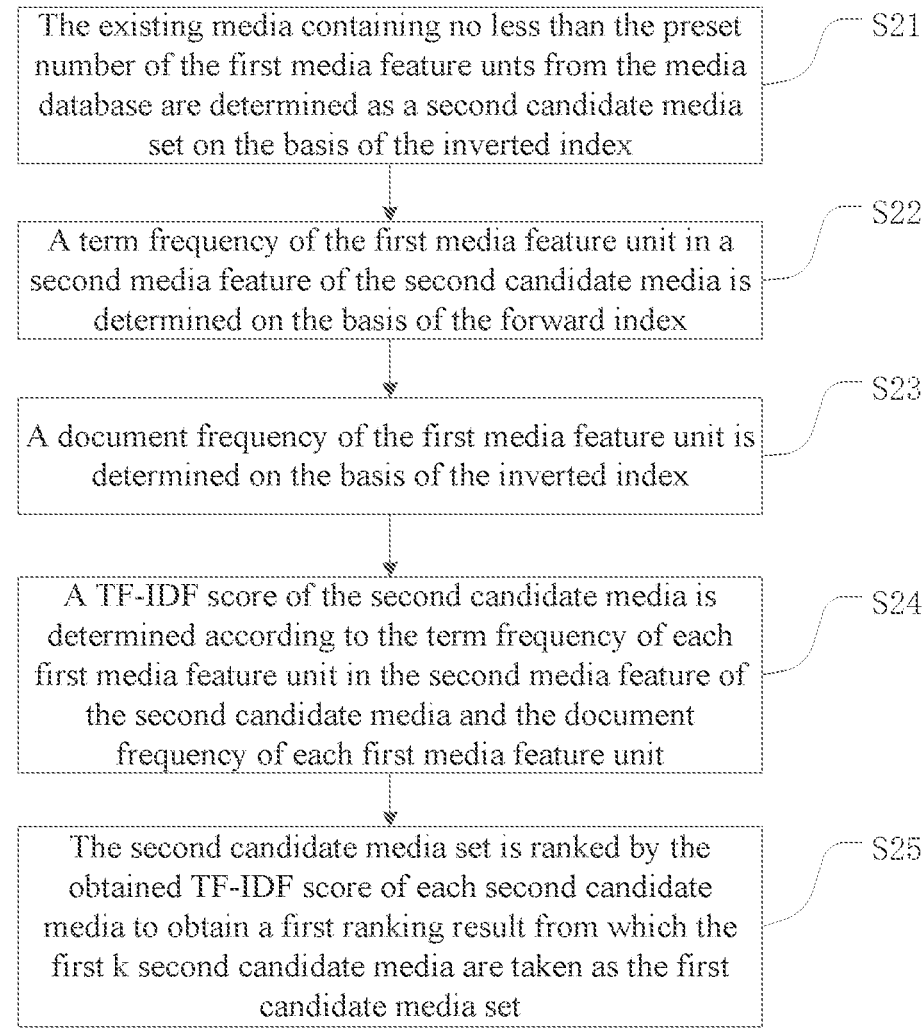
FIG. 3 is a flow block diagram of performing the first ranking provided by one embodiment of the present disclosure.

FIG. 3 is a schematic flow block diagram of performing the first ranking provided by one embodiment of the present disclosure. Referring to FIG. 3, the first ranking provided by one embodiment of the present disclosure comprises following steps:

At step S21, the presence of each first media feature unit in the second media features of the existing media is counted according to the inverted index so as to match the existing media containing no less than the preset number of the first media feature units from the media database to serve as a second candidate media set. Thereafter, the process proceeds to step S22.

It should be noted that the "number" in the "no less than the preset number of the first media feature units" means the type of the first media feature units. Specifically, the preset number may be one, and therefore, the matched second candidate media set is the existing media in which certain one type of first media feature unit appears in the second media feature; the preset quality may be multiple, and might as well be p (which is a positive integer), and therefore, the matched second candidate media set is the existing media in which at least p types of first media feature units appear in the second media feature.

At step S22, a term frequency of the first media feature unit in a second media feature of the second candidate media is determined on the basis of the forward index. The term frequency is the proportion of a first media feature unit among all media feature units included in a second media feature. Thereafter, the process proceeds to step S23.

At step S23, a document frequency of the first media feature unit is determined on the basis of the inverted index. The document frequency is, among the plurality of existing media (for example, all existing media in the media database) the proportion of the number of existing media containing the first media feature unit included in the second media feature to the total number of existing media. Thereafter, the process proceeds to step S24.

Step S24, a term frequency-inverse document frequency score of the second candidate media is determined according to the term frequency of each first media feature unit in the second media feature of the second candidate media and the document frequency of each first media feature unit. Thereafter, the process proceeds to step S25.

At step S25, the second candidate media set is ranked by the obtained term frequency-inverse document frequency score of each second candidate media to obtain a first ranking result from which first k second candidate media are taken as the first candidate media set. Meanwhile, the second media feature (forward index) of each first candidate media may also be returned for further processing of the first candidate media set on the basis of the second media feature in a subsequent step S12.

In the embodiment, an index server can be used for taking the set of the first media feature units of the Query Media as an index request, and exact match and TF-IDF ranking are performed according to the foregoing forward index and the inverted index so as to recall the second candidate media set and simultaneously return the obtained forward index of each second candidate media. Specifically, the steps described above may be performed in use of an open source Elasticsearch search engine to achieve rapid retrieval. In addition, the first media feature and the second media feature may be binarized in advance to facilitate index recall by the index server.

Notably, exact match and the first ranking focus on which existing media each individual first media feature unit appears in and the retrieval of the first media feature unit, while the effect of the order of each first media feature unit in the first media feature on the retrieval is not taken into consideration, or the whole of the media feature or the retrieval of a plurality of consecutive media feature units is not taken into consideration.

By performing the exact match and the first ranking, the media retrieval method provided by the present disclosure are capable of improving the accuracy and the efficiency of media retrieval greatly.

3. With Respect to Step S30

In some embodiments of the present disclosure, the second ranking is a ranking performed on the media in the first candidate media set, according to the presence of a sequential sequence, which comprises the first media feature units arranged in order, in the media features of the first candidate media. Specifically, the second ranking includes: the similarity matrix of the media in the first candidate media set is obtained according to the feature index of the existing media and the first media feature, and the media in the first candidate media set is ranked on the basis of the similarity matrix.

Figure 4:
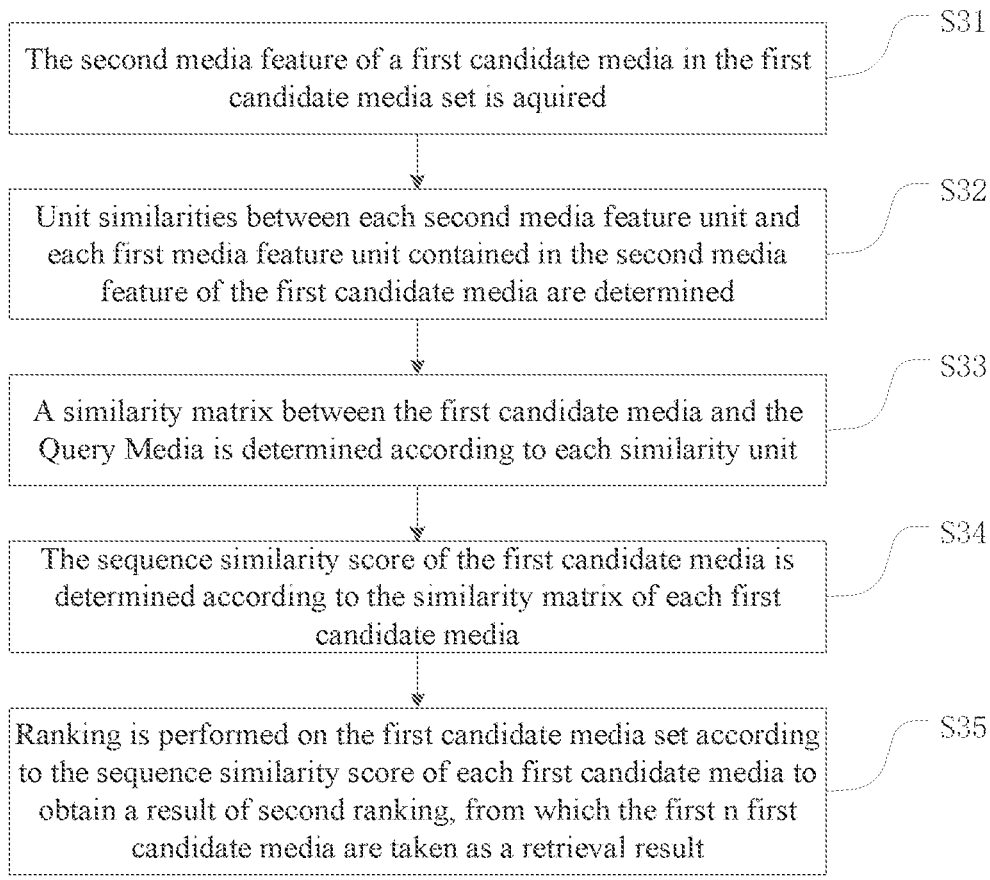
FIG. 4 is a flow block diagram of performing the second ranking provided by one embodiment of the present disclosure.

FIG. 4 is a schematic block diagram of the second ranking provided by one embodiment of the present disclosure. Referring to FIG. 4, in one embodiment of the present disclosure, the second ranking comprises the following steps:

S31, the second media feature of a first candidate media (in fact, each candidate media is the existing media) in the first candidate media set is acquired. Specifically, according to the feature index (such as forward index) of the existing media, the second media feature can be obtained. It may be assumed that the first media feature of the Query Media contains M1 first media feature units and the second media feature of the first candidate media contains M2 second media feature units, wherein M1 and M2 are both positive integers. It should be noted that the first media feature and the second media feature are the same type of media feature obtained by the same media feature extraction method. Then, the process proceeds step S32.

S32, unit similarities between each second single media feature unit and each first media feature unit contained in the second media feature of the first candidate media are determined, thus obtaining M1*M2 unit similarities, each of which represents a similarity degree between one first single media feature and one second single media feature, and specifically, the greater the unit similarity is, the more similar they are Then, the process proceeds step S33.

In an embodiment of the present disclosure, a distance or metric capable of determining the degree of similarity of the first and second media feature units may be selected as the unit similarity according to the type of the media feature.

Specifically, when the first media feature unit and the second media feature unit are both floating point number features, the unit similarity may be determined according to the cosine distance (or cosine similarity) between the first media feature unit and the second image; the cosine distance can generally be determined directly as the unit similarity.

And when the first media feature unit and the second media feature unit are both binarized features, the unit similarity can be determined according to the Hamming distance between the first media feature unit and the second media feature unit. Specifically, the Hamming distance between the first media feature unit and the second media feature unit is calculated firstly, then the difference value between the length of the media feature unit and the Hamming distance is calculated, and the ratio of the difference value to the length of the media feature unit is determined to be the unit similarity which represents the proportion of identical bits in the binarized first media feature unit and the binarized second media feature unit. The Hamming distance is a common measurement in the field of information theory, and the Hamming distance between two equal-length character strings is the number of different characters at corresponding positions of the two character strings. It should be noted that media feature units extracted using the same method generally have the same length.

It should be noted that the unit similarity is not limited to be represented by cosine distance or Hamming distance, but any distance or metric that can determine the degree of similarity of two image features can be used.

It should be noted that if each media feature unit corresponds to each frame of the media object, then the unit similarity may also be called inter frame similarity.

At step S33, a similarity matrix between the first candidate media and the Query Media is determined according to each similarity unit.

Specifically, each point in the similarity matrix corresponds to a unit similarity such that the similarity matrix records unit similarities between each second media feature unit and each first media feature unit of a first candidate media. And each point of the similarity matrix is arranged according to the sequence of the first media feature units of the Query Media in the first media feature in the transverse direction, and arranged according to the sequence of the second media feature units of first candidate media in the second media features in the longitudinal direction. Therefore, the point located at the ith row and the jth column represents the unit similarity between the ith first media feature unit of the Query Media and the jth second media feature unit of the Query Media respectively, and the similarity matrix is an M1×M2 matrix. Thereafter, the process proceeds to step S34.

It should be noted that in practice, it is not necessary to calculate each unit similarity in step S32 at first and then determine the similarity matrix in step S33, but the similarity matrix can be directly determined, and the corresponding unit similarity is calculated in the process of determining each point of the similarity matrix.

At step S34, the sequence similarity score of the first candidate media is determined according to the similarity matrix of each first candidate media, wherein the sequence similarity score is used to represent the similarity degree between the first candidate media and the Query Media and may be a score between 0 and 1, and the larger the number, the more similar the two media are. Thereafter, the process proceeds to step S35.

Specifically, the sequence similarity score is determined according to the straight line in the similarity matrix.

Note that since media features typically contain a finite number of media feature units, and thus the similarity matrix is a finite matrix, and in fact the so called "straight line" is a finite length of line segment made up of a number of points in the similarity matrix. The line has a slope that is a slope of a line connecting a plurality of points included in the line. In addition, the starting and ending points of the line may be any point in the similarity matrix and are not necessarily points at the edge.

The straight line of the present disclosure includes a diagonal line in the similarity matrix, each line segment parallel to the diagonal line having a slope of 1 from top left to bottom right in the similarity matrix, and lines having a slope other than 1. For example, it may be a straight line with a slope of approximately 1 to improve the robustness of the media retrieval; it may be a straight line with a slope of 2, 3, . . . or ½, ⅓, . . . or the like, so as to cope with the retrieval of the speed-regulated media; it may even be a line with a negative slope (line from bottom left to top right in the similarity matrix) to cope with the media subjected to the reverse playback process. The diagonal line is a line segment (in fact, a line starting at the point of the upper left corner and having a slope of 1) composed of points positioned at (1, 1), (2, 2), (3, 3) . . . .

In fact, each straight line in the similarity matrix is composed of a plurality of unit similarities arranged in sequence, so that the similarity of a segment of the Query Media and an existing media segment can be shown since each straight line shows the similarity of a plurality of media feature unit pairs which are arranged in sequence. Each media feature unit pair includes a first media feature unit and a second media feature unit. That is, each line represents a degree of similarity between a plurality of first media feature units arranged in sequence and a plurality of second media feature units arranged in sequence. The slope of the line and the starting and ending points represent the length and position of the two media segments. For example, since a straight line composed of (1, 1), (2, 3), (3, 5), (4, 7) shows similarity between the first media feature unit with ordinal number 1 and the second media feature unit with ordinal number 1, similarity between the first media feature unit with ordinal number 2 and the second media feature unit with ordinal number 3, . . . , therefore, the straight line can reflect the similarity between the segment of the Query Media corresponding to the first media feature units with the ordinal numbers of 1, 2, 3 and 4 and the segment of the existing media corresponding to the second media feature units with the ordinal numbers of 1, 3, 5 and 7.

Therefore, the similarity of two media can be determined from the straight line in the similarity matrix by: defining the average condition (or overall condition) of each unit similarity contained in the straight line as the straight line similarity of the straight line, wherein the straight line similarity can reflect the similarity between a plurality of corresponding first media feature units and a plurality of corresponding second media feature units; determining a straight line with the highest straight line similarity in the similarity matrix, which may be called as a matching straight line; determining the straight line similarity of the matching straight line as the sequence similarity score of the first candidate media.

It should be noted that a straight line with the highest straight line similarity can be determined from a plurality of preset straight lines in the process of determining the matching straight line; for example, a plurality of preset straight lines are all straight lines of which the slopes are a preset slope set value (for example, the slope is 1), or a plurality of points which enable the unit similarities to rank top may be selected from the similarity matrix, and a straight line is fitted according to the points so as to generate a straight line which enables the straight line similarity to be relatively highest.

At step S35, ranking is performed on the first candidate media set according to the sequence similarity score of each first candidate media to obtain a result of second ranking, from which first n first candidate media are taken as a retrieval result.

Due to the adoption of the second ranking, the media retrieval method provided by the present disclosure are capable of improving the accuracy and the efficiency of media retrieval greatly.

Figure 5:
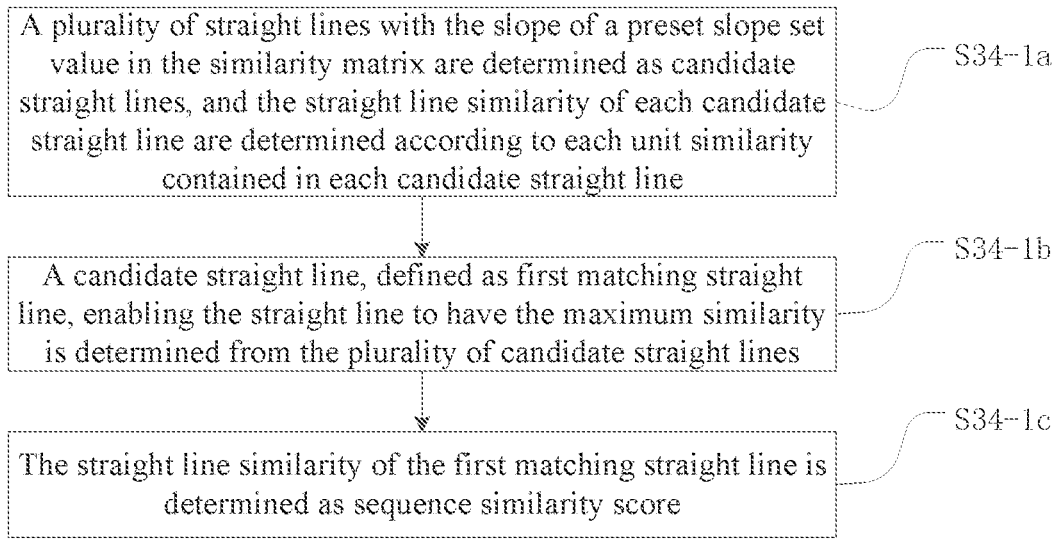
FIG. 5 is a flow block diagram of determining a sequence similarity score using dynamic programming provided by one embodiment of the present disclosure.

In one particular embodiment of the present disclosure, dynamic programming method may be utilized to determine the sequence similarity score on the basis of a similarity matrix. FIG. 5 is a schematic block flow diagram of media retrieval using dynamic programming method provided by one embodiment of the present disclosure. Referring to FIG. 5, in one embodiment, step S54 of the present disclosure includes the following specific steps:

Step S34-1a: a plurality of straight lines with the slope of a preset slope set value in the similarity matrix are determined as candidate straight lines, and the straight line similarity of each candidate straight line are determined according to each unit similarity contained in each candidate straight line. Specifically, the straight line similarity of a straight line may be set as an average value of unit similarities contained in the straight line, or may be set as a sum value of unit similarities contained in the straight line. In a specific exemplary embodiment, the set value for the slope may be taken as 1, i.e. the candidate straight lines are: the diagonal line and lines parallel to it in the similarity matrix. Thereafter, the process proceeds to step S34-1b.

It should be noted that in one embodiment of the present disclosure, step S64-1a further comprises: those lines containing a number of unit similarities less than a preset set value of the length for the straight line are excluded from the candidate straight lines, and then it is proceeded to step S64-1b. In other words, in the present embodiment, the candidate straight line must also satisfy: the number of unit similarities contained reaches the preset set value of the length for the straight line. By excluding the straight lines with insufficient unit similarities, the problem that the accuracy of the finally obtained sequence similarity score is influenced when the straight line contains insufficient unit similarities can be eliminated.

Step S34-1b: a candidate straight line, defined as first matching straight line, enabling the straight line to have the maximum similarity is determined from the plurality of candidate straight lines. Thereafter, the process proceeds to step S64-1c.

Step S34-1c: the straight line similarity of the first matching straight line is determined as sequence similarity score.

It should be noted that in some embodiments of the present disclosure, the preset set values for the slope in step S34-1a may be multiple, i.e., the candidate straight line is a straight line having a slope equal to any of the multiple set values for the slope, for example, the candidate straight line may be a straight line having a slope of 1, −1, 2, ½, etc. In step S34-1b, a first matching straight line is determined from a plurality of candidate straight lines having a slope at any one of the multiple set values for the slope.

By using the dynamic programming method to determine the sequence similarity score, the media retrieval method provided by the present disclosure are capable of improving the accuracy and the efficiency of media retrieval greatly.

Figure 6:
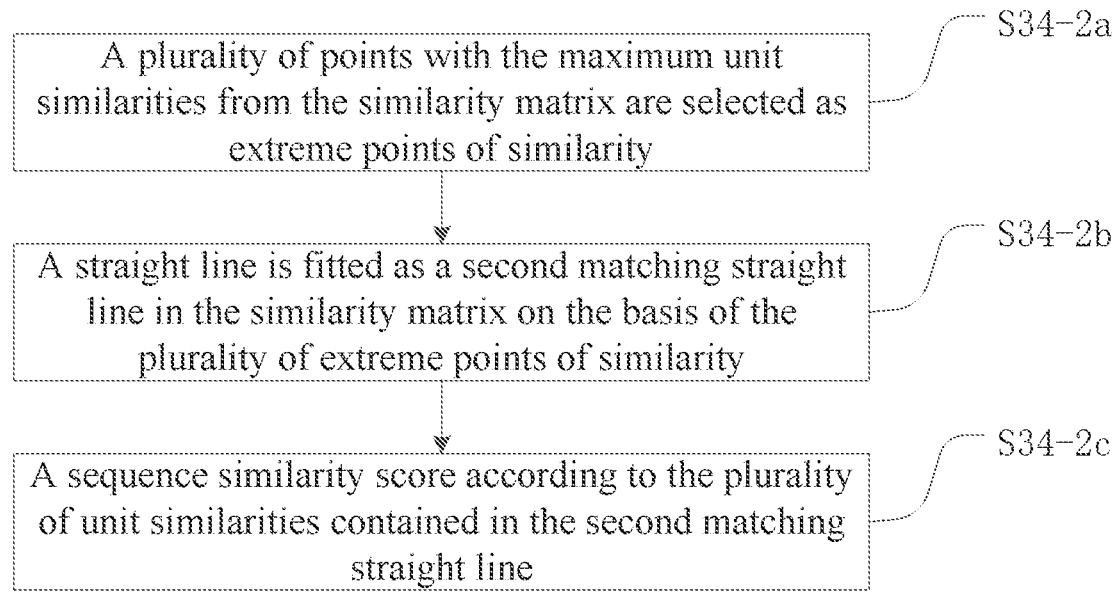
FIG. 6 is a flow block diagram of determining a sequence similarity score using a constant-speed media method provided by one embodiment of the present disclosure.

In another embodiment of the present disclosure, a constant-speed media method may also be used to determine the sequence similarity score on the basis of the similarity matrix. FIG. 6 is a schematic block flow diagram of media retrieval using the constant-speed media method provided by one embodiment of the present disclosure. Referring to FIG. 6 in one embodiment, step S34 of the present disclosure includes the following specific steps.

Step S34-2a: a plurality of points with the maximum unit similarities from the similarity matrix are selected as extreme points of similarity. The specific number of the extreme points of similarity may be preset. Thereafter, the process proceeds to step S34-2b.

Step S34-2b: a straight line is fitted as a second matching straight line in the similarity matrix on the basis of the plurality of extreme points of similarity. In some embodiments, a line having a preset set value for the slope or near the preset set value for the slope is fitted as a second matching straight line on the basis of the plurality of extreme points of similarity. For example, a line having a slope near 1 is fitted. Specifically, a line of which the slope approaches the set value for the slope can be fitted in the similarity matrix using the Random Sample Consensus (RANSAC) approach. The RANSAC approach is a common method for calculating mathematical model parameters of data according to a group of sample data sets containing abnormal data so as to acquire effective sample data. Thereafter, the process proceeds to steps S34-2c.

And S34-2c: a sequence similarity score according to the plurality of unit similarities contained in the second matching straight line. Specifically, the average value of the unit similarities on the second matching straight line may be determined as the sequence similarity score.

By using the constant-speed media method to determine the sequence similarity score, the media retrieval method provided by the present disclosure are capable of improving the accuracy and the efficiency of media retrieval greatly.

Furthermore, the similarity matrix may be obtained by comprehensive consideration of the multiple types of similarity of the media. Specifically, the media retrieval method of the present disclosure also includes: acquiring multiple types of the first media features of the Query Media, acquiring multiple types of second media features of the media in the first candidate media set, and determining the similarity matrix according to multiple types of second media features and multiple types of first media features. Then the similarity matrix based on the multiple types of media features is used to perform the second rank.

Figure 7:
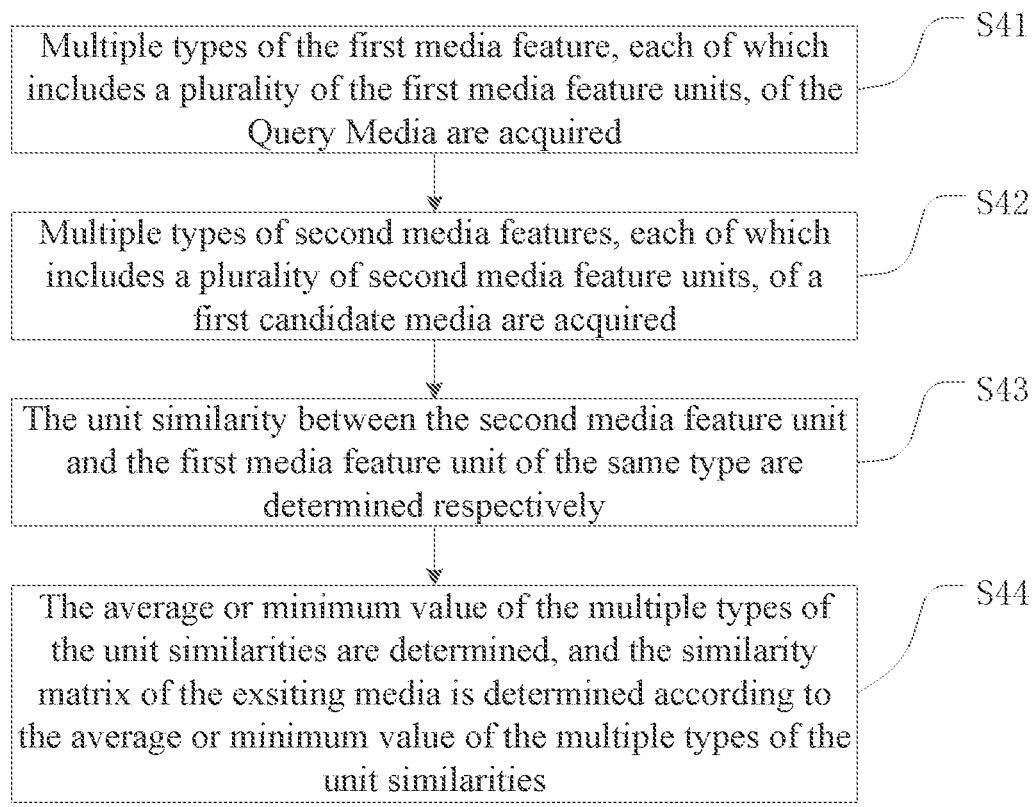
FIG. 7 is a flow block diagram of determining a similarity matrix on the basis of multiple types of first media features and second media features provided by one embodiment of the present disclosure.

FIG. 7 is a flow block diagram of determining a similarity matrix on the basis of multiple types of first media features and second media features provided by one embodiment of the present disclosure. Referring to FIG. 7, in one embodiment of the present disclosure, the media retrieval method provided by one embodiment of the present disclosure comprises the following steps.

At step S41: multiple types of the first media feature, each of which includes a plurality of the first media feature units, of the Query Media are acquired. Thereafter, the process proceeds to step S42.

For example, the aforementioned floating-point number feature and binarized feature of the Query Media are acquired at the same time.

At step S42, multiple types of second media features, each of which includes a plurality of second media feature units, of an existing media (specifically, the media in the aforementioned first candidate media set) are acquired, and the second media features of multiple types are indexed to obtain the feature index based on multiple types of media features. Thereafter, the process proceeds to step S43.

For example, the aforementioned floating-point number feature and binarized feature of the existing media are acquired at the same time.

At step S43, the unit similarity between the second media feature unit and the first media feature unit of the same type are determined respectively. Thus, multiple types of unit similarities corresponding to multiple types of media features are obtained. The second media feature unit may be obtained according to the feature index. Thereafter, the process proceeds to step S44.

At step S44, the average or minimum value of the multiple types of the unit similarities are determined, and the similarity matrix of the existing media is determined according to the average or minimum value of the multiple types of the unit similarities.

Thereafter, the process proceeds to step S34 in which the sequence similarity score and the result of the second ranking are determined according to the similarity matrix based on the average or minimum of the multiple types of unit similarities.

The effect of using the average value or minimum value of the multiple types of similarities to determine the similarity matrix lies in that there may be mismatches in media retrieval by using the similarity obtained from one type of media feature. By taking the average value or minimum value of the similarity of multiple type of media features, the problem of mismatches can be reduced or eliminated, so as to improve the accuracy of media retrieval.

It should be noted that before taking the average or minimum value of the multiple types of the unit similarities, it is necessary to ensure that the various unit similarities have a uniform value range. For example, the value range of all types of unit similarities can be set to 0 to 1 in advance. In fact, the examples of the unit similarity determined according to the cosine distance and the examples of the unit similarity determined according to the Hamming distance have both set the value range of the unit similarity to 0 to 1.

In some embodiments of the present disclosure, the acquired first media feature of the Query Media also includes a first credibility field for representing the credibility of the first media feature unit, and/or the acquired second media feature of the existing media also includes a second credibility field for representing the credibility of the second media feature unit; further, the media retrieval method may further comprises: when determining the unit similarity or the sequence similarity score, the first credibility field and/or the second credibility field are used for weighting, wherein, the high credibility field is given high weight and the low credibility field is given low weight, and then the second ranking is performing according to the weighted sequence similarity score. It should be noted that the credibility field may be recorded in the media features, or stored separately without being included in the media features. In the latter case, only the corresponding relationship between the media features and the credibility field needs to be configured.

In certain embodiments of the present disclosure, the media retrieval method also comprises the following steps: before the first ranking is performed, slicing the obtained first media feature of the Query Media and the second media feature of the existing media according to preset fixed length to obtain a plurality of first sub media features with the same length (including the same number of media feature units) and second sub media features (for example, slicing is performed before indexing in the embodiment which comprises a step of indexing on the second media feature); and/or before the media feature is obtained, slicing the Query Media and the existing media according to a preset fixed time span to obtain a plurality of the Query Media segments and the existing media segments with the same time span, then, acquiring the media feature of each Query Media segment and the media feature of each existing media segment respectively to obtain the first sub media feature of each Query Media segment and the second sub media feature of each existing media segment; and then, according to each first sub media feature and each second sub media feature, carrying out the above steps of first ranking and second ranking to obtain the retrieval result of each sub media feature, and then, determining the retrieval result of the original Query Media according to the retrieval result of each sub media feature.

The effects obtained by slicing the media or the media feature according to the fixed length are as follows: (1) that the TF-IDF ranking is fairer; (3) that the obtained unit similarity and sequence similarity score are more accurate; and (3) that a uniform length is favorable for storing the media feature and the feature index.

In certain embodiments of the present disclosure, the first media feature units in the first media feature and the second media feature units in the second media feature are arranged in a temporal order. For example, the first media feature units and the second media feature units are arranged in the order of time. In this case, the media retrieval method disclosed by the present disclosure also comprises the following steps: determining the duplicate segment of the Query Media and the existing media (which is specifically the media in the above retrieval result) according to the above similarity matrix; and specifically, according to the starting point and the end point of the straight line in the similarity matrix, obtaining the starting and ending time of the duplicate segment in the two media. For example, the start and end times of the Query Media and the duplicate segments in the existing media may be obtained according to the start and end points of the first matching straight line or the second matching straight line.

The specific method for determining the duplicate segment according to the straight line (such as the matching straight line) in the similarity matrix may comprise the following steps: according to the serial number (or an abscissa in the similarity matrix) of the first media feature unit corresponding to the starting point of the straight line, determining the starting time of the duplicate segment in the query media; according to the serial number (or an ordinate in the similarity matrix) of the second media feature unit corresponding to the starting point, determining the starting time of the duplicate segment in the first candidate media; similarly, according to the abscissa of the end point of the straight line, determining the ending time of the duplicate segment in the Query Medio; and according to the ordinate of the straight line, determining the ending time of the duplicate segment in the first candidate media.

In some embodiments of the present disclosure (e.g., the previously described embodiments shown in FIGS. 5 and 6), step S64 further comprises: detecting the starting part and the ending part of the obtained first matching straight line or second matching straight line, determining whether points (unit similarities) at the starting part and the ending part of the first matching straight line/second matching straight line reach a preset set value for the unit similarity, removing parts (with low unit similarity) of the starting part and the ending part of the first matching straight line/second matching straight line which do not reach the set value for the unit similarity, reserving a middle section of the straight line and defining the middle section of straight line as a third matching straight line; and determining the sequence similarity score according to the straight line similarity of the third matching straight line, and/or determining the starting and ending times of the duplicate segment of the Query Media and the existing media according to the starting point and the end point of the third matching straight line. By removing the parts with low similarity at the beginning and the ending parts of the matching straight line and reserving the straight line with high similarity at the middle section, and then determining the similarity between the Query Media and the existing media, the accuracy of the media retrieval can be improved, and the duplicate segment can be obtained more accurately.

The specific method for removing the parts which do not reach the set value for the unit similarity at the beginning/ending part of the matching straight line may be as follows: sequentially checking from the starting point/the end point to the middle of the matching straight line, determining whether the set value for the unit similarity is reached or not, and once the first point reaching the set value for the unit similarity is found, removing a plurality of points from the point to the starting point/the end point.

It should be noted that the unit similarity set value can be a specific value of unit similarity, which is used to determine whether a point reaches the value when checking, and it can also be a proportional value which is used to determine whether the ratio of a point to the average value or the maximum value of all points contained in the first/second matching line reaches the proportional value compared when checking.

Figure 8:
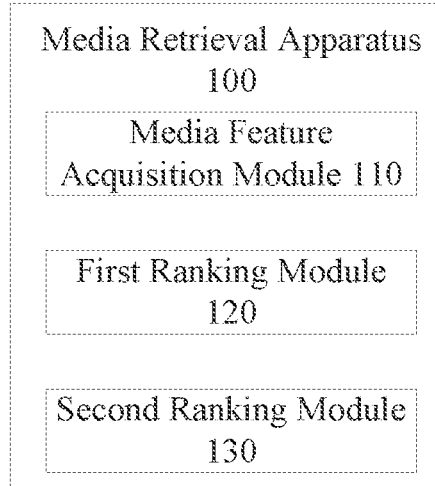
FIG. 8 is a flow block diagram of a media retrieval apparatus provided by one embodiment of the present disclosure.

FIG. 8 is a schematic structural block diagram of the media retrieval apparatus 100 of one embodiment of the present disclosure. Referring to FIG. 8, the media retrieval apparatus 100 according to an exemplary embodiment of the present disclosure mainly includes:

- a media feature acquisition module 110 configured to acquire a media feature of a media to be retrieved (Query Media) as a first media feature containing a plurality of first media feature units.
- a first ranking module 120 configured to perform a first ranking on a plurality of existing media according to the first media feature, and to take first k existing media as a first candidate media set according to the result of the first ranking, where k is a positive integer, and the specific value of k is configurable. Specifically, the first ranking module 120 is configured to perform a ranking based on the matching of each individual first media feature unit to an existing media. Further, the first ranking module 120 may perform a term frequency-inverse document frequency ranking on the existing media according to each first media feature unit.
- a second ranking module 130 configured to perform a second ranking on the first candidate media set according to the first media feature, and to take first n first candidate media in the first candidate media set as a retrieval result according to the result of the second ranking, where n is a positive integer and the specific value of n is configurable. Specifically, the second ranking is a ranking of the media in the first candidate media set based on a plurality of the first media feature units arranged in sequence.

The aforementioned existing media may be a media in a media database. A plurality of media features of the existing media are stored in the media database, and the same type of media features as the first media features obtained by using the same extraction method as the first media feature are included in the stored media features of the existing media.

In some embodiments of the present disclosure, the media retrieval apparatus 100 of the present disclosure further includes: feature indexing module (not shown in the figure) configured to acquire media features of a plurality of existing media as second media features which contain a plurality of second media feature units, and index the second media feature to obtain a feature index of the existing media. Meanwhile the first ranking module 120 is particularly configured to match the feature index with the first media feature unit to perform the TF-IDF ranking on the plurality of existing media.

Further, feature indexing module is configured to acquire a forward index and an inverted index of the media feature of the existing media.

In addition, if the first ranking is performed on all existing media in the media database, the efficiency of the second ranking may be affected, thus the first ranking module 120 may include an exact match sub-module 121 configured to make an exact match for the plurality of the existing media before the first ranking. The exact match is used for selecting the existing media with the number of the included first media feature units being no less than the preset number or the preset proportion as a second candidate media set. Then, a first ranking is performed on the second candidate media set to select the first candidate media set.

Figure 9:
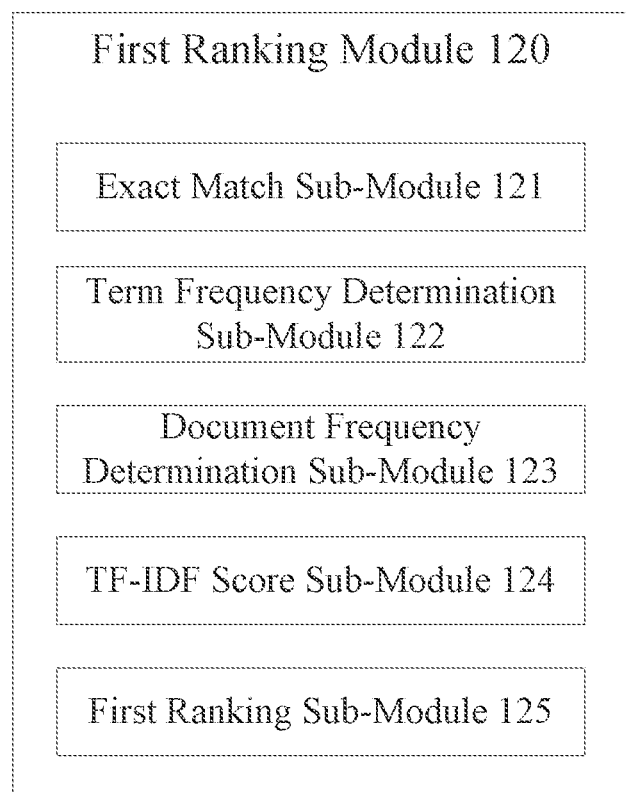
FIG. 9 is a structural block diagram of a first ranking module provided by one embodiment of the present disclosure.

FIG. 9 is a structural block diagram of a first ranking module 120 provided by one embodiment of the present disclosure. Referring to FIG. 3, the first module 120 provided by one embodiment of the present disclosure comprises:

- an exact match sub-module 121 configured to count the presence of each first media feature unit in the second media features of the existing media according to the inverted index so as to select the existing media containing no less than the preset number of the first media feature units from the media database to serve as a second candidate media set.
- a term frequency determination sub-module 122 configured to determine the term frequency of the first media feature unit in a second media feature of the second candidate media on the basis of the forward index.
- a document frequency determination sub-module 123 configured to determine the document frequency of the first media feature unit on the basis of the inverted index.
- a term frequency-inverse document frequency score sub-module 124 configured to determine the term frequency-inverse document frequency score of the second candidate media according to the term frequency of each first media feature unit in the second media feature of the second candidate media and the document frequency of each first media feature unit.
- a first ranking sub-module 125 configured to rank the second candidate media set by the obtained term frequency-inverse document frequency score of each second candidate media to obtain a first ranking result from which first k second candidate media are taken as the first candidate media set, and configured to return the second media feature (forward index) of each first candidate media to the second ranking module 130 for further processing.

In some embodiments of the present disclosure, the second ranking is a ranking performed on the media in the first candidate media set, according to the presence of a sequential sequence, which comprises the first media feature units arranged in order, in the media features of the first candidate media. Specifically, the second ranking module 130 is configured to obtain the similarity matrix of the media in the first candidate media set according to the feature index of the existing media and the first media feature, and rank the media in the first candidate media set on the basis of the similarity matrix.

Figure 10:
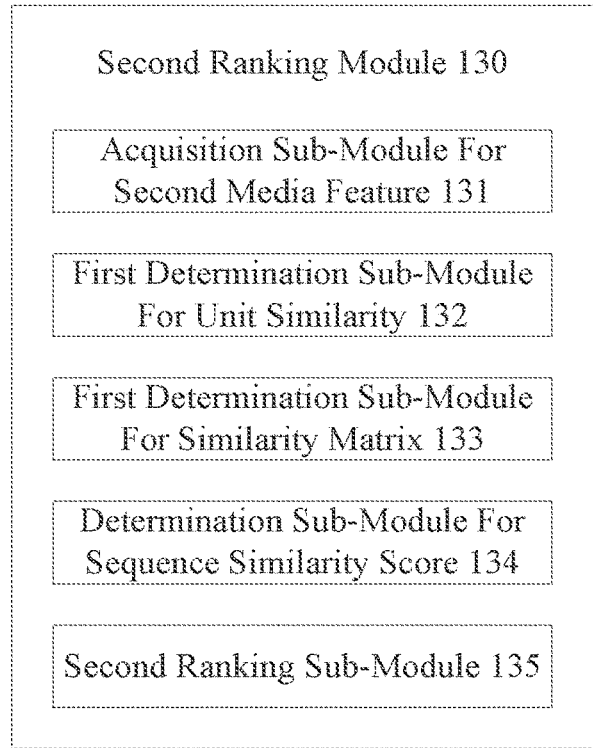
FIG. 10 is a structural block diagram of a second ranking module provided by one embodiment of the present disclosure.

FIG. 10 is a schematic structural diagram of a second ranking module 130 provided by one embodiment of the present disclosure. Referring to FIG. 4, in one embodiment of the present disclosure, the second ranking module 130 comprises:

an acquisition sub-module for second media feature 131 configured to acquire the second media feature of a first candidate media (in fact, each candidate media is the existing media) in the first candidate media set. Specifically, the second media feature may be acquired according to the feature index (such as forward index) of the existing media.

a first determination sub-module for unit similarity 132 configured to determine the unit similarities between each second single media feature unit and each first media feature unit contained in the second media feature of the first candidate media.

a first determination sub-module for similarity matrix 133 configured to determine a similarity matrix between the first candidate media and the Query Media according to each similarity unit.

a determination sub-module for sequence similarity score 134 configured to determine the sequence similarity score of the first candidate media according to the similarity matrix of each first candidate media. Specifically, the determination sub-module 134 for sequence similarity score may determine the sequence similarity score on the basis of the straight line in the similarity matrix.

a second ranking sub-module 135 configured rank the first candidate media set according to the sequence similarity score of each first candidate media to obtain a result of second ranking, from which first n first candidate media are taken as a retrieval result.

In one particular embodiment of the present disclosure, the determination sub-module 134 for sequence similarity score is specifically configured to use each step of the preceding dynamic programming method to determine the sequence similarity score.

In another embodiment of the present disclosure, the determination sub-module 134 for sequence similarity score is specifically configured to use each step of the preceding constant-speed media method to determine the sequence similarity score.

Figure 11:
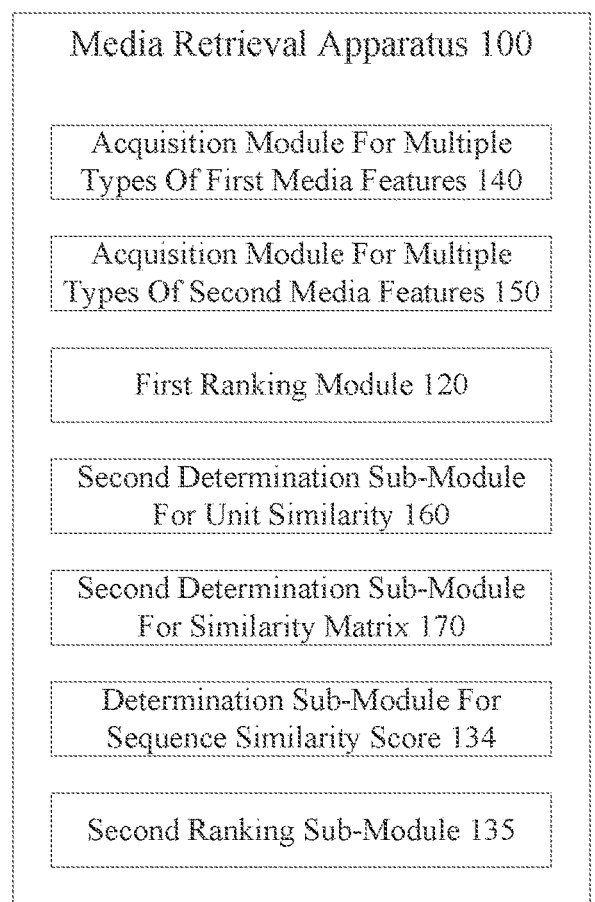
FIG. 11 is a structural block diagram of a media retrieval apparatus which determines the similarity matrix based on multiple types of first media features and second media features provided by one embodiment of the present disclosure.

Further, the similarity matrix is obtained by the comprehensive consideration of the similarities of multiple types of media. FIG. 11 is a schematic structural diagram of a media retrieval apparatus 100 which determines the similarity matrix based on multiple types of first media features and second media features provided by one embodiment of the present disclosure. Referring to FIG. 7, in one embodiment of the present disclosure, the media retrieval apparatus 100 provided by one embodiment of the present disclosure comprises.

an Acquisition module for multiple types of first media features 140 configured to acquire multiple types of the first media feature of the Query Media and each type of the first media feature include a plurality of the first media feature units.

an Acquisition module for multiple types of second media features 150 configured to acquire multiple types of second media features of an existing media (specifically, the media in the aforementioned first candidate media set) are acquired, and each type of second media feature includes a plurality of second media feature units. In some exemplary embodiments, a feature index acquisition module (not shown in the figure) is included therein to index the second media features of multiple types to obtain the feature index based on multiple types of media features.

a second determination sub-module for unit similarity 160 configured to determine the unit similarity between the second media feature unit and the first media feature unit of the same type respectively so as to obtain multiple types of the unit similarities. The second media feature unit may be obtained on the basis of the feature index.

a second determination sub-module for similarity matrix 170 configured to determine the average or minimum value of the multiple type of unit similarities and determine the similarity matrix of the existing media according to the average or minimum value of the multiple type of the unit similarities.

Therefore, the preceding sequence similarity score determination sub-module 134 for sequence similarity score are configured to determine the sequence similarity score according to the similarity matrix based on the average or minimum of the multiple types of unit similarities.

In some embodiments of the present disclosure, the acquired first media feature of the Query Media also includes a first credibility field for representing the credibility of the first media feature unit, and/or the acquired second media feature of the existing media also includes a second credibility field for representing the credibility of the second media feature unit; further, the second ranking module 130 may further be configured to use the first credibility field and/or the second credibility field for weighting when determining the unit similarity or the sequence similarity score, wherein, the high credibility field is given high weight and the low credibility field is given low weight, and then perform the second ranking according to the weighted sequence similarity score.

In some embodiments of the present disclosure, the media retrieval apparatus further comprises a media slice module (not shown in the figure). The media slice module is configured to slice, before the first ranking is performed, the obtained first media feature of the Query Media and the second media feature of the existing media according to preset fixed length to obtain a plurality of first sub media features and second sub media features of the same length (including the same number of media feature units); and/or, the media slice module is configured to slice, before the media feature is obtained, the Query Media and the existing media according to a preset fixed time span to obtain a plurality of the Query Media segments and the existing media segments with the same time span, and then acquire the media feature of each Query Media segment and the media feature of each existing media segment respectively to obtain the first sub media feature of each Query Media segment and the second sub media feature of each existing media segment. And the preceding first ranking module 120 and second ranking module 130 are configured to carry out the above steps of first ranking and second ranking, according to each first sub media feature and each second sub media feature, to obtain the retrieval result of each sub media feature, and then, determine the retrieval result of the original Query Media according to the retrieval result of each sub media feature.

In certain embodiments of the present disclosure, the first media feature units in the first media feature and the second media feature units in the second media feature are arranged in a temporal order. In this case, the media retrieval apparatus disclosed by the present disclosure also comprises a duplicate segment determination module (not shown in the figure) configured to determine the duplicate segment of the Query Media and the existing media according to the preceding similarity matrix; and specifically to obtain, according to the starting point and the end point of the straight line in the similarity matrix, the starting and ending time of the duplicate segment in the two media.

Figure 12:
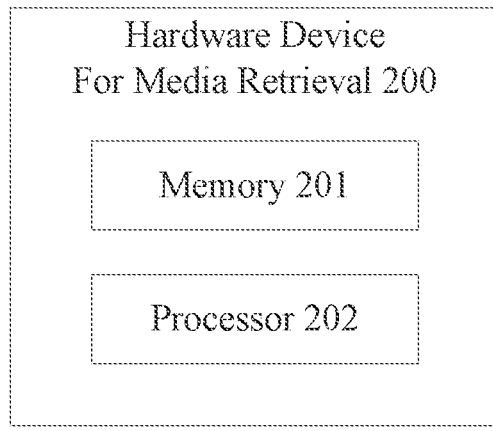
FIG. 12 is a hardware block diagram of a hardware device for media retrieval provided by one embodiment of the present disclosure.

FIG. 12 is a hardware block diagram of a hardware device for media retrieval according to one embodiment of the present disclosure. As shown in FIG. 12, the hardware device 200 for media retrieval according to the embodiment of the present disclosure includes a memory 201 and a processor 202. The components in the hardware device 200 for media retrieval are interconnected by a bus system and/or other forms of connection mechanisms (not shown).

The memory 201 is used for storing non-transitory computer-readable instructions. Specifically, the memory 201 may include one or more computer program products, which may include various forms of computer-readable storage media, such as volatile memory and/or non-volatile memory. The volatile memory may include, for example, random access memory (RAM) and/or cache, etc. The nonvolatile memory may include, for example, read only memory (ROM), hard disk, flash memory, etc.

The processor 202 may be a central processing unit (CPU) or other forms of processing unit having data processing capability and/or instruction execution capability, and may control other components in the hardware device 200 for media retrieval to perform desired functions. In one embodiment of the present disclosure, the processor 202 is used for executing the computer-readable instructions stored in the memory 201 so that the hardware device 200 for media retrieval performs all or part of the steps of the aforementioned method for media retrieval according to the embodiments of the present disclosure.

Figure 13:
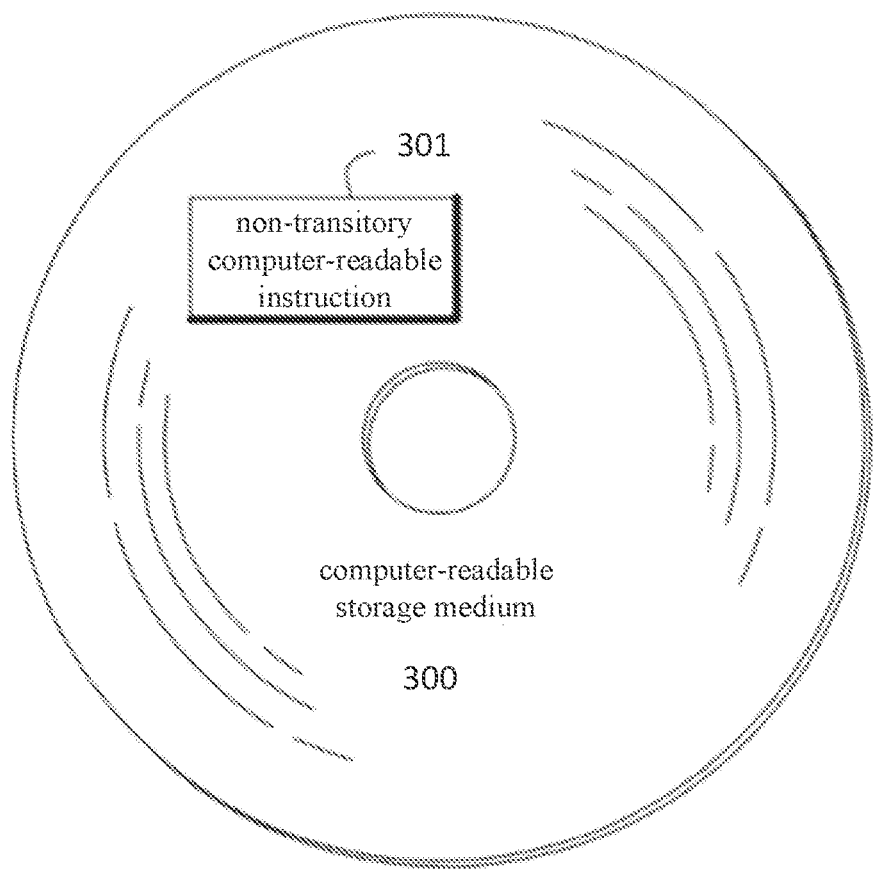
FIG. 13 is a schematic diagram of a computer-readable storage medium provided by one embodiment of the present disclosure.

FIG. 13 is a schematic diagram of a computer-readable storage medium according to one embodiment of the present disclosure. As shown in FIG. 13, the computer-readable storage medium 300 according to the embodiment of the present disclosure has non-transitory computer-readable instructions 301 stored thereon. When the non-transitory computer-readable instructions 301 are executed by the processor, all or part of the steps of the aforementioned method for media retrieval according to the embodiments of the present disclosure are executed.

Figure 14:
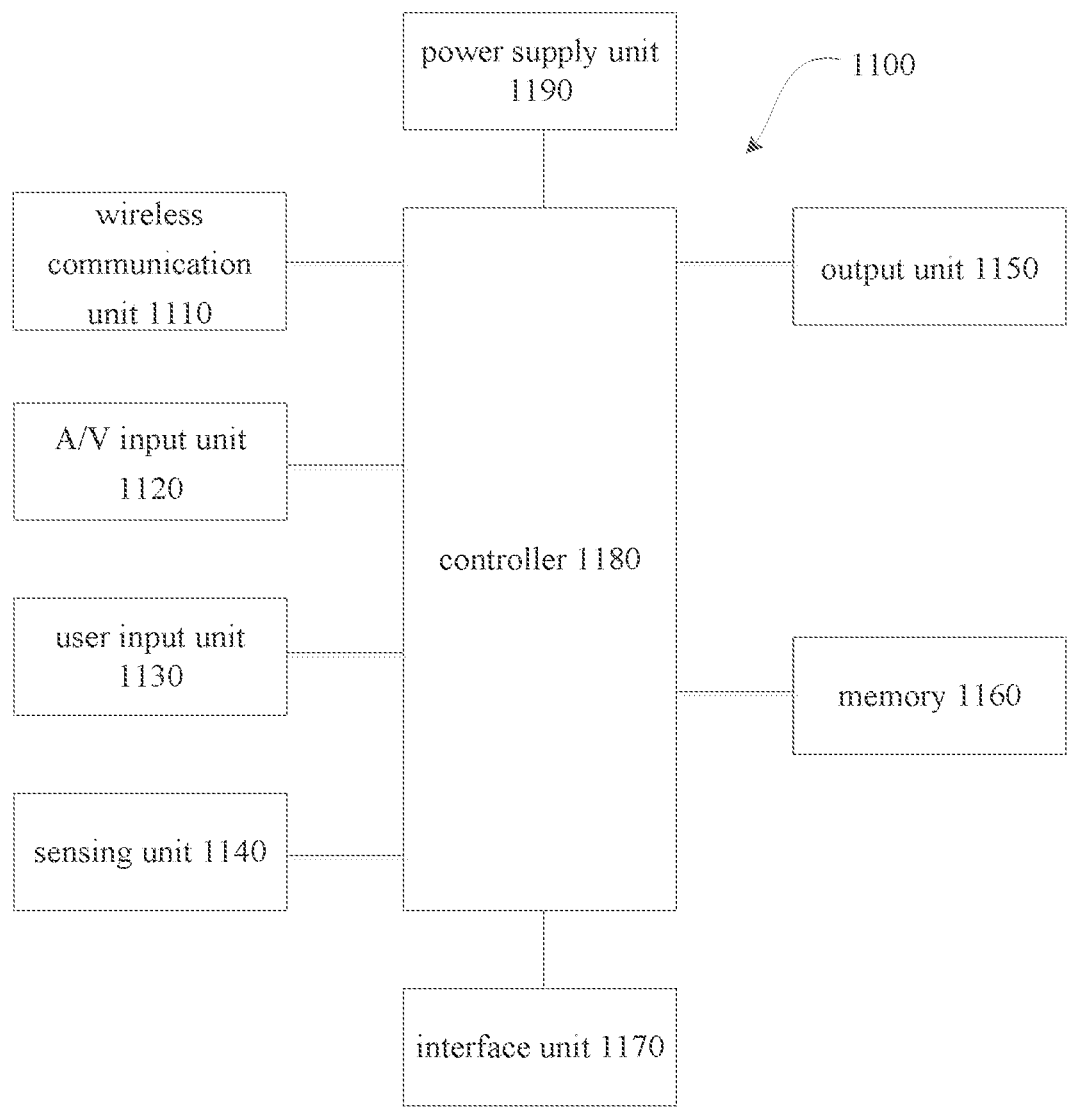
FIG. 14 is a structural block diagram of terminal device provided by one embodiment of the present disclosure.

FIG. 14 is a hardware structure diagram of a terminal device according to one embodiment of the present disclosure. The terminal device may be implemented in various forms, and the terminal device in the present disclosure may include, but is not limited to, mobile terminal device such as mobile phone, smart phone, notebook computer, digital broadcast receiver, personal digital assistant (PDA), PAD, portable multimedia player (PMP), navigation device, vehicle-mounted terminal device, vehicle-mounted display terminal, and vehicle-mounted electronic rearview mirror, and fixed terminal devices such as digital TV and desktop computer.

As shown in FIG. 14, the terminal device 1100 may include a wireless communication unit 1110, an A/V (audio/video) input unit 1120, a user input unit 1130, a sensing unit 1140, an output unit 1150, a memory 1160, an interface unit 1170, a controller 1180, a power supply unit 1190, and the like. FIG. 15 shows a terminal device having various components, but it should be understood that not all of the illustrated components are required to be implemented. More or fewer components may be implemented alternatively.

The wireless communication unit 1110 allows radio communication between the terminal device 1100 and a wireless communication system or network. The A/V input unit 1120 is used for receiving audio or video signals. The user input unit 1130 may generate key input data according to commands input by a user to control various operations of the terminal device. The sensing unit 1140 detects the current state of the terminal device 1100, the position of the terminal device 1100, the presence of touch input of a user to the terminal device 1100, the orientation of the terminal device 1100, and the acceleration or deceleration movement and direction of the terminal device 1100, and generates commands or signals for controlling the operation of the terminal device 1100. The interface unit 1170 serves as an interface through which at least one external device may be connected to the terminal device 1100. The output unit 1150 is configured to provide an output signal in a visual, audio, and/or tactile manner. The memory 1160 may store software programs and the like for processing and controlling operations executed by the controller 1180, or may temporarily store data which have been output or are to be output. The memory 1160 may include at least one type of storage medium. Moreover, the terminal device 1100 may cooperate with a network storage device which performs the storage function of the memory 1160 through network connection. The controller 1180 generally controls the overall operation of the terminal device. In addition, the controller 1180 may include a multimedia module for reproducing or playing back multimedia data. The controller 1180 may perform pattern recognition processing to recognize handwriting input or picture drawing input performed on a touch screen as characters or images. The power supply unit 1190 receives external power or internal power under the control of the controller 1180 and provides appropriate power required to operate various elements and components.

Various embodiments of the media retrieval method provided by the present disclosure may be implemented by a computer-readable medium using, for example, computer software, hardware, or any combination thereof. For hardware implementation, various embodiments of the media retrieval method provided by the present disclosure may be implemented by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, various embodiments of the media retrieval method provided by the present disclosure may be implemented in the controller 1180. For software implementation, various embodiments of the media retrieval method provided by the present disclosure may be implemented with a separate software module which allows at least one function or operation to be performed. A software code may be implemented by a software application program (or program) written in any suitable programming language, and the software code may be stored in the memory 1160 and executed by the controller 1180.

In summary, according to the method, apparatus, hardware device, computer-readable storage medium and terminal device for media retrieval provided by the embodiment of the present disclosure, the efficiency and accuracy of the media retrieval can be greatly improved by performing the first ranking on the basis of each individual of the media feature unit in the media feature of the query media and performing the second ranking according to the plurality of the media feature units arranged in sequence in the media feature of the query media.

The basic principles of the present disclosure have been described above in connection with the specific embodiments. However, it should be noted that the advantages, effects, and the like referred to in the present disclosure are merely examples and these advantages, effects, and the like are not considered to be necessary for each embodiments of the present disclosure. In addition, the specific details of the above disclosure are only for the purpose of illustration and convenience of understanding, and are not intended to limit the present disclosure.

The block diagrams of device, apparatus, equipment, and systems referred to in the present disclosure are only illustrative examples and are not intended to require or imply that connections, arrangements, and configurations must be made in the manner shown in the block diagrams. As will be realized by those skilled in the art, these device, apparatus, equipment and systems can be connected, arranged and configured in any way. Terms such as "include", "contain", "have", "comprise", or any other variation, which refer to "including but not limited to", are not limiting and can be used interchangeably with them. The terms "or" and "and" refer to the terms "and/or" and can be used interchangeably with them, unless the context indicate otherwise. The term "such as" refers to the phrase "such as but not limited to" and can be used interchangeably with it.

In addition, as used herein, "or" used in the enumeration of items starting with "at least one" indicates a separate enumeration, so that, for example, the enumeration of "at least one of A, B or C" means A or B or C, or AB or AC or BC, or ABC (i.e., A and B and C). Furthermore, the phrase "exemplary" does not mean that the described example is preferred or better than other examples.

It should also be noted that in the systems and methods of the present disclosure, various components or steps may be decomposed and/or recombined. These decompositions and/or recombination should be considered as equivalents to the present disclosure.

Various changes, substitutions, and modifications of the techniques herein may be made without departing from the techniques taught by the appended claims. In addition, the scope of the claims of the present disclosure is not limited to the specific aspects of the above-mentioned processing, machine, manufacturing, composition of the event, means, methods and actions, which can be carried out with basically the same functions or achieve basically the same results as the corresponding aspects described herein. Therefore, the appended claims include the processing, machine, manufacturing, composition of the event, means, methods and actions within their scope.

The above description of the disclosed aspects is provided to enable those skilled in the art to make or use the disclosure. Various modifications to these aspects are apparent to those skilled in the art, and the general principles defined herein may be applied to other aspects without departing from the scope of the present disclosure. Therefore, the present disclosure is not intended to be limited to the aspects shown herein, but in accordance with the widest range consistent with the principles and novel features disclosed herein.

The above description has been given for the purpose of illustration and description. Furthermore, this description is not intended to limit embodiments of the present disclosure to the form disclosed herein. Although a plurality of exemplary aspects and embodiments have been discussed above, those skilled in the art will recognize certain variations, modifications, changes, additions and sub combinations thereof.

The invention claimed is:

1. A media retrieval method, comprising:
acquiring a plurality of types of media feature of a query media, wherein each of the plurality of types of media feature contains a plurality of first media feature units;
performing, according to each individual of the plurality of first media feature units, a first ranking on a plurality of existing media, wherein the performing a first ranking on a plurality of existing media comprises matching each individual of the plurality of first media feature units to each of the plurality of existing media;
taking, according to a result of the first ranking, first k existing media as a first candidate media set, where k is a positive integer;
performing, according to the plurality of the first media feature units arranged in sequence, a second ranking on the first candidate media set, wherein the plurality of the first media feature units are arranged in a chronological order, wherein the performing a second ranking on the first candidate media set comprises performing the second ranking on the first candidate media set based on the plurality of the first media feature units in the chronological order, and wherein the performing the second ranking on the first candidate media set further comprises:
determining a plurality of types of unit similarity corresponding to the plurality of types of media feature, wherein the plurality of types of media feature comprise a type of floating-point number feature and another type of binarized feature,
determining a similarity matrix of each media in the first candidate media set based on an average or a minimum value of the plurality of types of unit similarity, and
determining a result of the second ranking based on the similarity matrix; and
taking, according to the result of the second ranking, first n first candidate media as a retrieval result, where n is a positive integer.

2. The method according to claim 1, further comprising:
acquiring a media feature of the existing media as a second media feature in advance which contains a plurality of second media feature units; and
indexing the second media feature to obtain a feature index of the existing media in advance.

3. The method according to claim 2, wherein the performing, according to each individual of the first media feature unit, a first ranking on a plurality of existing media comprises:
performing, according to each individual of the first media feature unit, a term frequency-inverse document frequency (TF-IDF) ranking on a plurality of existing media.

4. The method according to claim 3, wherein the performing, according to each individual of the first media feature unit, a term frequency-inverse document frequency (TF-IDF) ranking on a plurality of existing media comprises:
matching the feature index of the existing media with the first media feature unit to perform the TF-IDF ranking on the existing media.

5. The method according to claim 4, wherein the obtaining a feature index of the existing media in advance comprises:
acquiring a forward index and/or an inverted index of the existing media in advance.

6. The method according to claim 4, wherein the matching the feature index of the existing media with the first media feature unit comprises:
making an exact match for the feature index of the existing media and the first media feature unit.

7. The method according to claim 2, wherein the performing, according to the plurality of the first media feature units arranged in sequence, a second ranking on the first candidate media set comprises:
obtaining a similarity matrix of the media in the first candidate media set according to the feature index of the existing media and the first media feature, and ranking the media in the first candidate media set on the basis of a straight line in the similarity matrix.

8. The method according to claim 7, wherein the acquiring a media feature of a query media as a first media feature comprises: acquiring multiple types of first media features of the query media;
wherein the acquiring the media feature of the existing media as a second media feature in advance comprises: acquiring multiple types of second media feature of the existing media; and
wherein the obtaining a similarity matrix of the media in the first candidate media set according to the feature index of the existing media and the first media feature comprises: determining the similarity matrix according to the multiple types of the second media features and the multiple types of the first media features.

9. The method according to claim 8, wherein each type of the first media feature includes a plurality of the first media feature units, and each type of the second media feature includes a plurality of the second media feature units;
wherein the determining the similarity matrix according to the multiple types of the second media features and the multiple types of the first media features comprises:
determining the unit similarity of the same type of the second media feature unit and the first media feature unit respectively so as to obtain multiple types of the unit similarities; determining the average or minimum value of the multiple types of the unit similarities and determining the similarity matrix according to the average or minimum value of the multiple types of the unit similarities.

10. The method according to claim 7, wherein, the plurality of the first media feature units are arranged in a temporal order in the first media feature, and the plurality of the second media feature units are arranged in a temporal order in the second media feature.

11. The method according to claim 10, further comprising:
determining duplicate segments of the query media and the media in the retrieval result according to the straight line in the similarity matrix.

12. The method according to claim 2, further comprising:
slicing the query media and the existing media according to a preset time span to obtain a plurality of segments of the sub query media and segments of the sub existing media, and extracting the media features of the plurality of segments of the sub query media and segments of the sub existing media respectively to obtain a plurality of the first sub media features and the second sub media features of the same length.

13. The method according to claim 2, further comprising:
slicing, before the first ranking is performed, the obtained first media feature of the query media and the second media feature of the existing media according to a preset length to obtain a plurality of the first sub media features and the second sub media features of the same length.

14. A media retrieval apparatus, comprising:
at least one processor; and
at least one memory communicatively coupled to the at least one processor and storing instructions that upon execution by the at least one processor cause the apparatus to:
acquire a plurality of types of media feature of a media as a first media feature, wherein each of the plurality of types of media feature contains a plurality of first media feature units;
perform, according to each individual of the plurality of first media feature units, a first ranking on a plurality of existing media, wherein the performing a first ranking on a plurality of existing media comprises matching each individual of the plurality of first media feature units to each of the plurality of existing media;
take, according to the result of the first ranking, the first k existing media as a first candidate media set, wherein k is a positive integer;
perform, according to the plurality of the first media feature units arranged in sequence, a second ranking on the first candidate media set, wherein the plurality of the first media feature units are arranged in a chronological order, wherein performing a second ranking on the first candidate media set comprises performing the second ranking on the first candidate media set based on the plurality of the first media feature units in the chronological order, and wherein the performing the second ranking on the first candidate media set further comprises:
determining a plurality of types of unit similarity corresponding to the plurality of types of media feature, wherein the plurality of types of media feature comprise a type of floating-point number feature and another type of binarized feature,
determining a similarity matrix of each media in the first candidate media set on an average or a minimum value of the plurality of types of unit similarity, and
determining a result of the second ranking based on the similarity matrix; and
take, according to the result of the second ranking, the first n first candidate media as retrieval result, wherein n is a positive integer.

15. The apparatus according to the claim 14, wherein the at least one memory further stores instructions that upon execution by the at least one processor cause the device system to:
acquire a media feature of the existing media as a second media feature in advance which contains a plurality of second media feature units; and
index the second media feature to obtain a feature index of the existing media in advance.

16. The apparatus according to claim 15, wherein the at least one memory further stores instructions that upon execution by the at least one processor cause the apparatus to:

perform, according to each individual of the first media feature unit, a term frequency-inverse document frequency (TF-IDF) ranking on a plurality of existing media.

17. The apparatus according to claim 15, wherein the at least one memory further stores instructions that upon execution by the at least one processor cause the apparatus to:
obtain a similarity matrix of the media in the first candidate media set according to the feature index of the existing media and the first media feature, and ranking the media in the first candidate media set on the basis of a straight line in the similarity matrix.

18. The apparatus according to claim 17, wherein the at least one memory further stores instructions that upon execution by the at least one processor cause the apparatus to:
acquire multiple types of first media features of the query media;
acquire multiple types of second media feature of the existing media; and
determine the similarity matrix according to the multiple types of the second media features and the multiple types of the first media features.

19. The apparatus according to claim 15, wherein the at least one memory further stores instructions that upon execution by the at least one processor cause the apparatus to:
slice the query media and the existing media according to a preset time span to obtain a plurality of segments of the sub query media and segments of the sub existing media, and extract the media features of the plurality of segments of the sub query media and segments of the sub existing media respectively to obtain a plurality of the first sub media features and the second sub media features of the same length.

20. A non-transitory computer-readable storage medium, storing computer-readable instructions to perform operations when the computer-readable instructions are executed by a computing device, the operations comprising:
acquiring a plurality of types of media feature of a query media as a first media feature, wherein each of the plurality of types of media feature contains a plurality of first media feature units;
performing, according to each individual of the plurality of first media feature units, a first ranking on a plurality of existing media, wherein the performing a first ranking on a plurality of existing media comprises matching each individual of the plurality of first media feature units to each of the plurality of existing media;
taking, according to a result of the first ranking, first k existing media as a first candidate media set, where k is a positive integer;
performing, according to the plurality of the first media feature units arranged in sequence, a second ranking on the first candidate media set, wherein the plurality of the first media feature units are arranged in a chronological order, wherein the performing a second ranking on the first candidate media set comprises performing the second ranking on the first candidate media set based on the plurality of the first media feature units in the chronological order, and wherein the performing the second ranking on the first candidate media set further comprises:
determining a plurality of types of unit similarity corresponding to the plurality of types of media feature, wherein the plurality of types of media feature comprise a type of floating-point number feature and another type of binarized feature,
determining a similarity matrix of each media in the first candidate media set based on an average or a minimum value of the plurality of types of unit similarity, and
determining a result of the second ranking based on the similarity matrix; and
taking, according to the result of the second ranking, first n first candidate media as a retrieval result, where n is a positive integer.

\* \* \* \* \*